United States Patent [19]

Yuki et al.

[11] Patent Number: 4,658,273

[45] Date of Patent: Apr. 14, 1987

[54] WALL MEMBER FOR INK LIQUID RESERVOIR MOUNTED ON A CARRIAGE IN AN INK JET SYSTEM PRINTER

[75] Inventors: Yoshio Yuki, Nabari; Takafumi Hara, Tsuzuki, both of Japan

[73] Assignee: Sharp Kabushiki Kaisha, Osaka, Japan

[21] Appl. No.: 681,251

[22] Filed: Dec. 13, 1984

[30] Foreign Application Priority Data

Dec. 16, 1983 [JP] Japan .......................... 58-194578[U]

[51] Int. Cl.[4] .......................................... G01D 15/16

[52] U.S. Cl. .......................................... 346/140 R

[58] Field of Search .......................... 346/140, 140 A

[56] References Cited

U.S. PATENT DOCUMENTS

| | | | |
|---|---|---|---|
| 3,277,495 | 10/1966 | Caldwell | 346/140 |
| 3,953,862 | 4/1976 | Amberntsson | 346/140 |
| 4,025,928 | 5/1977 | Hou | 346/140 A |
| 4,301,459 | 11/1981 | Isayama | 346/140 |
| 4,306,245 | 12/1981 | Kasugayama | 346/140 |
| 4,319,254 | 3/1982 | Hurkmans | 346/140 |
| 4,511,906 | 4/1985 | Hara | 346/140 |

*Primary Examiner*—Joseph W. Hartary
*Attorney, Agent, or Firm*—Birch, Stewart, Kolasch & Birch

[57] ABSTRACT

An ink liquid supply system for an ink jet system printer including a printing head comprises an ink liquid reservoir for containing ink liquid, an ink liquid passage for supplying the ink liquid from the ink liquid reservoir to the printing head, the ink liquid passage having an ink liquid inlet for communicating with the ink liquid reservoir, and a wall member disposed around the ink liquid inlet of the ink liquid passage, the wall member providing a recess containing an extra amount of the ink liquid.

9 Claims, 4 Drawing Figures

FIG. 1
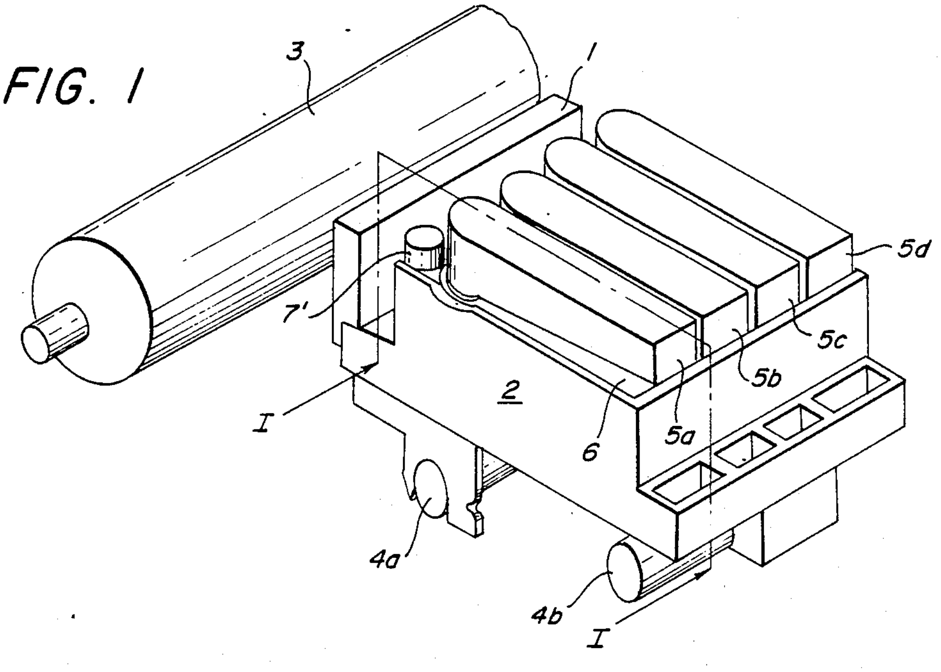
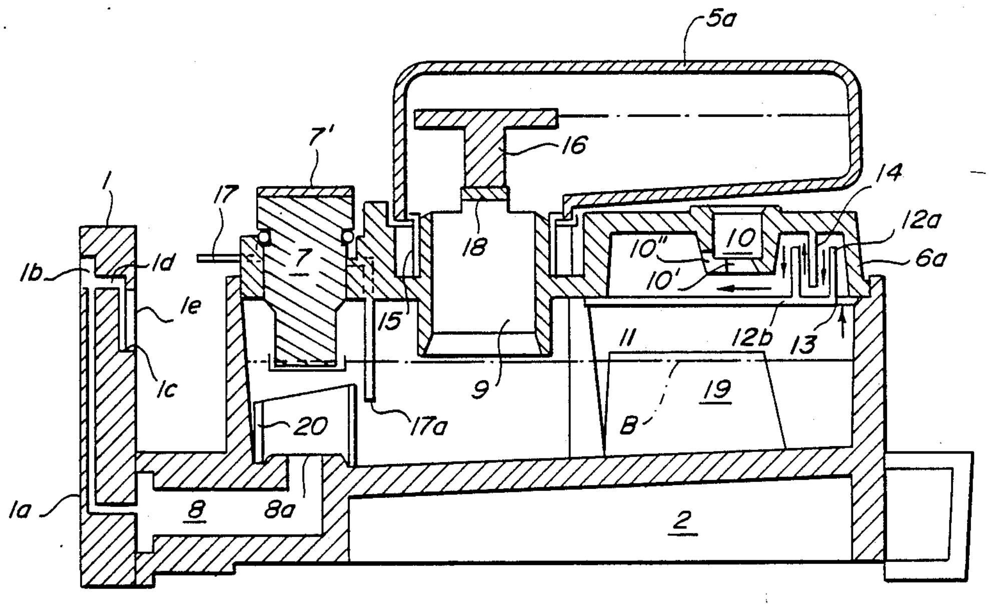
FIG. 2

FIG. 3
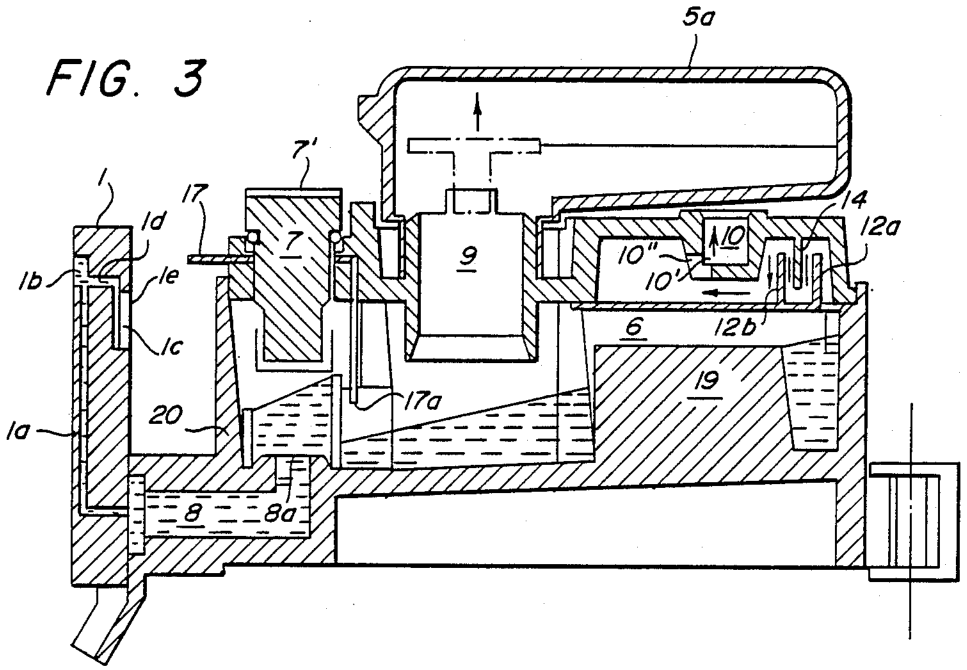
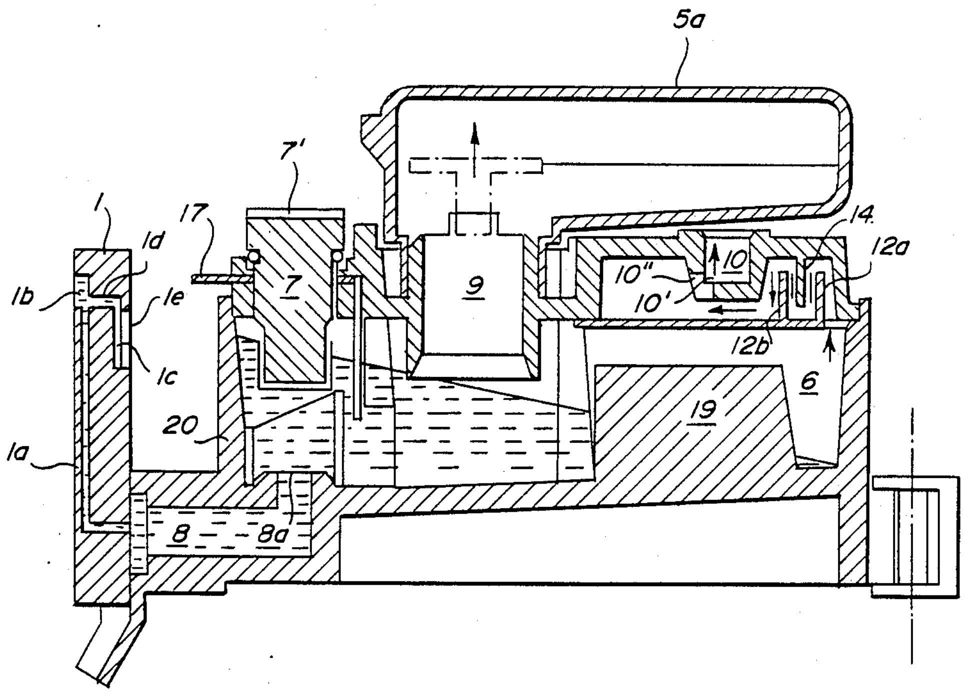
FIG. 4

WALL MEMBER FOR INK LIQUID RESERVOIR MOUNTED ON A CARRIAGE IN AN INK JET SYSTEM PRINTER

BACKGROUND OF THE INVENTION

The present invention relates to an ink liquid supply system in an ink jet system printer and, more particularly, to a wall member for an ink liquid reservoir mounted on a carriage in an ink jet system printer.

One type of a ink liquid supply system in an ink jet system printer of the ink-on-demand type is known as follows. The ink jet system printer of the ink-on-demand type includes an ink liquid reservoir mounted on a carriage which supports a printing head. An ink cartridge is removably disposed on the ink reservoir in order to maintain the amount of ink liquid at a desired level. The printing head includes a nozzle portion which communicates with the ink liquid reservoir so that the ink liquid is supplied from the ink liquid reservoir to the nozzle portion by means of capillarity.

In the ink jet system printer including the above ink liquid supply system, when the ink jet system printer is carried from one place to another, the printer may be inclined. If the printer is inclined, the ink liquid in the ink liquid reservoir flows from the high portion to the low portion so that the ink liquid may be accumulated in the low portion of the ink liquid reservoir. Therefore, the problem happens that the nozzle portion of the printing head which jets the ink liquid may absorb air so that the ink liquid is not jetted from the nozzle portion when the ink jet system printer performs the next printing operation. The problem prevents the printer from ensuring a stable printing operation.

To solve the above problem, the printer must be inclined within a range between ±2 degrees. However, it may be difficult to maintain the necessary inclination of ink jet system printer. So, the printer must be carefully carried.

OBJECTS AND SUMMARY OF THE INVENTION

Accordingly, an object of the present invention is to provide an ink liquid reservoir for an ink jet system printer which ensures a stable operation of an ink jet system printer.

Another object of the present invention is to provide a wall member for an ink liquid reservoir in an ink jet system printer which prevents air from being absorbed into a nozzle portion even when the printer is greatly inclined and which ensures an ink liquid supply to the nozzle portion.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, an ink liquid supply system for an ink jet system printer including a printing head comprises an ink liquid reservoir for containing ink liquid, an ink liquid passage for supplying the ink liquid from the ink liquid reservoir to the printing head, the ink liquid passage having an ink liquid inlet for communicating with the ink liquid reservoir, and a wall member disposed around the ink liquid inlet of the ink liquid passage, the wall member providing a recess containing an extra amount of the ink liquid.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 shows a perspective view of an ink jet system printer including an ink liquid reservoir according to an embodiment of the present invention;

FIG. 2 shows a sectional view taken along line I—I of FIG. 1; and

FIGS. 3 and 4 show sectional views taken along line I—I of FIG. 1 when the ink jet system printer is inclined, respectively.

DETAILED DESCRIPTION OF THE INVENTION

FIG. 1 shows a perspective view of an ink jet system printer including an ink liquid reservoir according to an embodiment of the present invention. FIG. 2 shows a sectional view taken along line I—I of FIG. 1.

An ink jet system printer of the ink-on-demand type includes a printer head 1 which is mounted on a carriage 2 to confront a platen 3. A pair of slide bars **4*a* and 4*b* are disposed at the bottom of the carriage 2 along the platen 3 in order to slidably support the carriage 2. The carriage 2 is connected to a driving system (not shown) such as a motor, and is driven to reciprocate along the slide bars 4*a* and 4*b***.

An ink liquid reservoir 6 is mounted on the carriage 2. Furthermore, the ink liquid reservoir 6 is divided into four chambers. Four ink liquid cartridges **5*a*, 5*b*, 5*c* and 5*d* are mounted on their respective chambers of the ink liquid reservoir 6 in order to supply ink liquid of different colors (magenta, yellow, cyan, and black) to the respective chambers formed in the ink liquid reservoir 6**.

FIG. 2 shows a construction related to one of the four chambers of the ink liquid reservoir 6, to which the ink liquid cartridge **5*a*** is connected.

The printer head 1 includes an ink liquid passage **1*a*, a nozzle slit portion 1*b*, an orifice 1*d*, a pressure chamber 1*c*, and an oscillating piezoelectric transducer 1*e***.

The nozzle slit portion **1*b* is communicated to the ink liquid passage 1*a*. The ink liquid passage 1*a* is communicated to the ink liquid reservoir 6 through an ink liquid passage 8. The nozzle slit portion 1*b* is further communicated to the pressure chamber 1*c* through the orifice 1*d*. The piezoelectric transducer 1*e* for vibrating is disposed at the back of the pressure chamber 1*c* in order to emit ink droplets from the nozzle slit portion 1*b* at a desired timing. Therefore, the ink liquid is supplied from the ink liquid reservoir 6 to the nozzle slit portion 1*a*** by means of capillarity.

A valve 7 in a cylindrical shape, for example, is disposed in the ink liquid reservoir 6 so as to close an inlet of the ink liquid passage 8. When the valve 7 closes the inlet of the ink liquid passage 8, the ink liquid is not supplied into the ink liquid passage 8 from the ink liquid reservoir 6. A control knob 7' is projected on the front portion of a ceiling wall **6*a* of the ink liquid reservoir 6 for controlling the level of the valve 7**.

The ink cartridge 5*a* is removably mounted on the ink liquid reservoir 6 so that an ink liquid outlet 15 of the ink cartridge 5*a* is engaged with an ink liquid inlet 9 of the ink liquid reservoir 6. The ink liquid inlet 9 of the ink liquid reservoir 6 is formed at the center of the ceiling wall 6*a* of the ink liquid reservoir 6.

A considerably large opening 10 is formed at the back portion of the ceiling wall 6*a* of the ink liquid reservoir 6 for discharging the air from the ink liquid reservoir 6 and for ensuring a smooth supply of the ink liquid to the nozzle slit portion 1*b*.

A periphery wall 10' of the opening 10 is extruded into the ink liquid reservoir 6 and has a narrow gap 10" in order to communicate the ink liquid reservoir 6 to the atmosphere. That is, the opening 10 functions to prevent the ink liquid reservoir 6 from reaching a negative pressure.

An ink liquid level sensor 17 such as an electrode pole is disposed in the ink liquid reservoir 6 in order to detect the amount of ink liquid in the reservoir 6 through the use of the conductivity of the ink liquid.

A flat plate 11 is disposed and fixed at the upper portion in the ink liquid reservoir 6 to confront the opening 10, and substantially extends over the inner full width of the chamber of the ink liquid reservoir 6. An aperture 13 is formed at the end of the flat plate 11 adjacent to a back side wall supporting the ceiling wall 6*a* to flow the air therethrough, and further, upward barriers 12*a* and 12*b* are disposed on the flat plate 11 in parallel with each other toward the ceiling wall 6*a*. The upward barriers 12*a* and 12*b* are integral with the flat plate 11, and are provided adjacent to the aperture 13. Each of the barriers 12*a* and 12*b* has a free top which is separated from the ceiling wall 6*a*.

A downward barrier 14 is extruded from the ceiling wall 6*a* toward the flat plate 11, and is inserted between the upward barriers 12*a* and 12*b*. The downward barrier 14 has a free top which is separated from the flat plate 11. The upward barriers 12*a* and 12*b*, and the downward barrier 14 form a labyrinth passage as shown by the arrows. The flat plate 11, the barriers 12*a*, 12*b*, and 14 are provided for preventing the ink liquid from reaching the opening 10.

Plates 19 are secured on the bottom wall of the ink liquid reservoir 6 such that each of the plates 19 has a free top end which is separated from the flat plate 11. The plates 19 prevent the ink liquid in the ink liquid reservoir 6 from tossing and leaping upon movement of the carriage 2.

When the ink liquid cartridge 5*a* is mounted on the ink liquid reservoir 6 so that the ink liquid outlet 15 of the cartridge 5*a* is engaged with the ink liquid inlet 9 of the ink liquid reservoir 6, with adequate pressure, the ink liquid in the cartridge 5*a* is supplied into the chamber of the ink liquid reservoir 6. Before the ink liquid outlet 15 of the cartridge 5*a* is engaged with the ink liquid inlet 9 of the ink liquid reservoir 6, an inside lid 16 is connected to or attached to the ink liquid outlet 15 of the cartridge 5*a*.

When the ink liquid outlet 15 is engaged with the ink liquid inlet 9 by pushing the ink liquid cartridge 5*a*, the inside lid 16 is detached from the ink liquid outlet 15 such that a projection disposed at the upper portion of the ink liquid inlet 9 pushes the inside lid 16 into the ink liquid cartridge 5*a*. Therefore, the ink liquid in the ink liquid cartridge 5*a* is supplied into the chamber of the ink liquid reservoir 6.

The ink liquid reservoir 6 is communicated with the atmosphere through the opening 10 and the labyrinth passage so as to prevent the ink liquid in the printing head from flowing backward, so that the pressure of the ink liquid reservoir 6 becomes positive.

The tip 17*a* of the electrode pole 17 is disposed into the ink liquid reservoir 6. When the ink liquid in the ink liquid reservoir 6 is lower than the level of the tip 17*a* of the electrode pole 17 as the level sensor, e.g., the amount of the ink liquid in the ink liquid reservoir 6 is less than a predetermined amount, the level sensor 17 can detect that the ink liquid level in the ink liquid reservoir 6 is less than the predetermined level of the ink liquid. At this time, the carriage 2 is returned to an initial position (or a home position) and is stationary. The ink liquid level in the ink liquid reservoir 6 is always maintained at the dotted line B of FIG. 2.

The ink liquid passage 8 is communicated to the ink liquid reservoir 6 through an ink liquid inlet 8*a*. The ink liquid inlet 8*a* is formed at the bottom wall of the ink liquid reservoir 6. The ink liquid contained in the ink liquid reservoir 6 is supplied to the printing head 1 through the ink liquid inlet 8*a* and the ink liquid passage 8.

A wall member 20 in a cylindrical shape, for example, is disposed on the bottom wall of the ink liquid reservoir 6 for providing a recess (or a cavity) containing an appropriate amount of extra ink liquid. The wall member 20 is upright around the ink liquid inlet 8*a* toward the ceiling wall 6*a*, and has a free top end which is separated from the ceiling wall 6*a* of the ink liquid reservoir 6. The free top end of the wall member 20 is cut away.

The wall member 20 prevents the air from being abosrbed into the nozzle slit portion 1*b* through the ink liquid passage 8 and 1*a* even when the ink jet system printer is inclined.

When the ink jet system printer having the ink liquid reservoir including the wall member 20 is carried or inclined, for example, when the level of the front portion with the printing head is higher than that of the back portion of the ink liquid reservoir 6, the level of the ink liquid in the ink liquid reservoir 6 changes as shown in FIG. 3. The level of the ink liquid at the back portion of the ink liquid reservoir 6 is higher than that of the ink liquid at the front portion of the ink liquid reservoir 6. The ink liquid in the ink liquid reservoir 6 is denoted by a shaded portion.

In the embodiment of FIG. 3, the wall member 20 for providing the recess containing the extra ink liquid is additionally disposed around the ink liquid inlet 8*a* communicating the ink liquid supply passage 8 and the chamber of the ink liquid reservoir 6. Therefore, even when the printer is inclined at an angle of about 45 degrees as shown in FIG. 3, the appropriate amount of the ink liquid remains in the cavity by the wall member 20. Accordingly, the ink liquid supply passage 8, the ink liquid passage 1*a*, the nozzle slit portion 1*b*, and the pressure chamber 1*c* fill with the ink liquid in the cavity by the wall member 20, so that the air cannot be absorbed from the nozzle slit portion 1*b* into the printing head 1.

When the printer is carried, additionally, the valve 7 may be inserted within the wall member 20 so as to close the ink liquid inlet 8*a* of the ink liquid passage 8. In such a case, while the valve 7 closes the ink liquid inlet 8*a*, an amount of the ink liquid is present in a cavity defined by the valve 7 and the wall member 20 without any air. It can be further ensured that no air can invade into the nozzle slit portion 1*b*.

As described above, in the present invention, because the ink liquid can be suitably supplied from the ink liquid reservoir 6 to the nozzle portion 1*b* by means of capillarity even when the printer is inclined, the nozzle slit portion 1*b* can always emit ink droplets for printing.

If the wall member 20 is not provided and the printer is inclined, a part of the ink liquid in the ink liquid supply passage 8 flows into the ink liquid reservoir 6, and the pressure of the nozzle slit portion 1*b* becomes negative and the nozzle slit portion absorbs the air therein in place of the ink liquid.

On the other hand, when the level of the front portion with the printing head 1 is less than that of the back portion of the ink liquid reservoir 6, the level of the ink liquid in the ink liquid reservoir 6 changes as shown in FIG. 4. In this case, the ink liquid passage 8 is filled with the ink liquid in the ink liquid reservoir 6. Therefore, the air is not absorbed from the nozzle slit portion 1*b* of the printing head 1.

In the embodiment of the present invention, through the wall member 20 is separately provided with the ink liquid reservoir 6, the wall member 20 may be integrally combined with the ink liquid reservoir 6. For example, the bottom wall of the ink liquid reservoir 6 around the ink liquid inlet 8*a* may be extruded toward the ceiling wall 6*a* so as to fill with the ink liquid however the printer may be inclined.

The planar shape of the wall member should not be limited to a cylinder. Rectangular shapes or the like may also be used. It may be unnecessary to cut away the wall member.

The ink liquid reservoir having the wall member may be applied to any other type of printer. The wall member may be substantially upright.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet printer having a printing head mounted on a carriage, said system comprising:

ink liquid reservoir means, mounted on said carriage within said printing head for maintaining a supply of ink liquid, said ink liquid reservoir means including an upper ceiling wall with an opening and an inlet therein and a base portion opposing said ceiling wall;

a flat plate disposed in said ink liquid reservoir in order to prevent the ink liquid from reaching said opening in said upper ceiling, wherein said flat plate includes upward barrier plates extending toward said ceiling wall and having a free top, and wherein said ceiling wall includes a downward barrier plate extending toward said flat plate and having a free top, said downward barrier plate being inserted between said upward barrier plates of said flat plate so as to form a labyrinth path;

ink liquid cartridge means, removably mounted on said ink liquid reservoir means, for supplying the ink liquid into said ink liquid reservoir means through said inlet;

conduit means for delivering the ink liquid from said ink liquid reservoir means to said printing head, said ink liquid conduit means having an ink liquid inlet disposed in the base portion of said ink liquid reservoir means for communication therewith; and means for preventing air from entering said ink liquid inlet of said conduit means to interrupt the flow of ink from said ink liquid reservoir means to said printing head even in the event said ink jet printer is inclined.

2. The ink liquid supply system of claim 1, wherein the printer is an ink-on-demand type.

3. The ink liquid supply system of claim 1, wherein said printing head includes a nozzle portion for emitting ink droplets and wherein said conduit means supplies the ink liquid from said ink liquid reservoir to said nozzle portion by means of capillarity.

4. The ink liquid supply system of claim 1, further including valve means operatively connected to said upper ceiling wall, said valve means being actuated toward said base portion to prevent air from entering said ink liquid inlet by closing said ink liquid inlet of said conduit means.

5. The ink liquid supply system of claim 1, wherein said means for preventing air from entering said ink liquid inlet of said conduit means is a wall member having an exposed upper end which is separated from said ceiling wall.

6. The ink liquid supply system of claim 5, wherein said wall member is in a substantially upright orientation around said ink liquid inlet.

7. The ink liquid supply system of claim 5, wherein said wall member is removably attached to the base portion of said ink liquid reservoir.

8. The ink liquid supply system of claim 5, wherein said wall member is integrally connected with the base portion of said ink liquid reservoir.

9. The ink liquid supply system of claim 5, wherein said wall member is cylindrical.

* * * * *